United States Patent [19]
Bakker et al.

[11] Patent Number: 5,478,285
[45] Date of Patent: Dec. 26, 1995

[54] BELT TENSIONER WITH PIVOT BUSHING DAMPING

[75] Inventors: Emile A. M. Bakker, Gulpen, Netherlands; Matthias H. Schwarz, Geilenkirchen, Germany

[73] Assignee: The Gates Rubber Company, Denver, Colo.

[21] Appl. No.: 381,575

[22] Filed: Jan. 31, 1995

[51] Int. Cl.$^6$ .................................................. F16H 7/12
[52] U.S. Cl. ............................................................ 474/135
[58] Field of Search .............................. 474/94, 133, 135

[56] References Cited

U.S. PATENT DOCUMENTS

| | | |
|---|---|---|
| Re. 34,543 | 2/1994 | Komorowski ........................ 474/135 |
| 4,551,120 | 11/1985 | Thomey ............................... 474/135 |
| 4,698,049 | 10/1987 | Bytzek et al. ....................... 474/135 |
| 4,723,934 | 2/1988 | Thomey ............................... 474/135 |
| 4,824,421 | 4/1989 | Komorowski ........................ 474/135 |
| 4,957,471 | 9/1990 | St John ......................... 474/135 X |
| 5,064,405 | 11/1991 | St John ............................... 474/133 |
| 5,256,112 | 10/1993 | Thomey ............................... 474/112 |
| B14,723,934 | 6/1992 | Thomey ............................... 474/135 |

*Primary Examiner*—Roger J. Schoeppel
*Attorney, Agent, or Firm*—H. W. Oberg; C. H. Castleman; S. G. Austin

[57] ABSTRACT

A belt tensioner type with a pivot-arm pivotally mounted a cocave arcuate bushing supported by a base, a pulley rotatably mounted to the pivot-arm, and a spring between the pivot-arm and base biasing the position of the pivot-arm and wherein the arcuate bushing provides bearing support and damping to pivoted movements of the pivot-arm.

15 Claims, 1 Drawing Sheet

BELT TENSIONER WITH PIVOT BUSHING DAMPING

BACKGROUND OF THE INVENTION

The invention relates to a spring-biased, automatic belt tensioner with a pivot-arm but more particularly, the invention relates to a tensioner having an arcuate bushing that provides bearing support and damping to pivoted movements of the pivot-arm.

Automatic belt tensioners for automotive use have a pivot-arm that is pivotally mounted at a base. A pulley is rotatably mounted to the pivot-arm and a spring between the pivot-arm and base biases the position of the pivot-arm to place the pulley against an endless belt of a belt drive system to tension the belt. It is preferred in some applications to have a bushing for a pivot of the pivot-arm in a common radial plane with the pulley to simplify bearing loads. Tensioners with pivot bushings and pulleys aligned in a common radial plane have evolved with pivot-arm lengths that may be classified into three distinct categories. In a first category, the length of the pivot arm is less than the radius of the inside diameter of a bearing that rotatably mounts the pulley. Such tensioners are sometimes referred to as eccentric type tensioners. In a second category of tensioners, the length of the pivot-arm is less than the radius of the pulley and are sometimes referred to as "pivot-in-pulley" or "short-arm" tensioners. A third category of tensioners have a pivot-arm length that is greater than the radius of the pulley.

The size of such belt tensioners largely depends on the length of the tensioner's pivot arm. The shorter the pivot-arm, the smaller the tensioner, and conversely the longer the pivot-arm, the larger the tensioner. If the pivot-arm is too short, the tensioner will not provide the necessary "take-up adjustment" to accommodate belt manufacturing tolerances, belt installation tolerances, and belt stretch during belt operation. If the pivot-arm is too long, the tensioner may not be able to fit within an allotted space for the tensioner.

The smallest size tensioners are the eccentric type of the first category where a pivot and effective pivot-arm are located within the confines defined by the inside diameter or bore of a pulley bearing of the tensioner. An example of an eccentric type belt tensioner with a minimum size bearing and pivot arm length is disclosed in U.S. Pat. No. 5,256,112. The length of the pivot-arm in tensioners in the first category may be increased by using a larger sized bearing which result in the bearing being oversized for the load that it must carry. An oversize bearing may result in increasing the necessary size for the tensioner as well as introducing excessive costs. Tensioners of the eccentric type may have pivot-arm lengths from about 5 millimeters to about 15 millimeters.

In a second category of tensioners, the axis for the pivot of the pivot-arm is located in a space generally limited by the outside diameter of the tensioner's pulley. Examples of "short-arm" tensioners in this second category are disclosed in U.S. Pat. No. 4,551,120 and U.S. Pat. No. Re. 34,543 (formally U.S. Pat. No. 4,824,421). A problem associated with these types of "short-arm" tensioners is that the pulley and pulley bearing usually need to be resized should it be necessary to change (increase or decrease) pivot-arm length. The tensioners of the '120 type generally have a pivot-arm length of about 30 to 35 millimeters. The tensioners of the '543 type allow a pivot-arm length of about 5 to 15 mm but the longer pivot-arm results in a large pulley diameter.

Within the third category of tensioners there is a type that has an arcuate bushing that provides bearing support and damping to pivoted movements of a pivot-arm. Such tensioners have an arcuate bushing at a large radius to provide a necessary damping to pivot-arm movements, and in some designs, a torsional spring surrounds the arcuate bushing at a even larger radius. The length of the pivot-arm in such tensioners must be sufficient to clear the radius of the arcuate bushing and the larger diameter torsional spring. Such tensioners typically have a pivot-arm length of about 75 mm. to about 100 mm. and are sometimes referred to as "long arm" tensioners. A "long arm" tensioner is disclosed in U.S. Pat. No. 4,723,934 (and B 1 4,723,934). While "long-arm" tensioners have proven satisfactory in several applications and have desirable economic advantages because they lack complex damping mechanisms, there inherently long pivot-arm (75 mm. to 100 mm.) somewhat limits their use because the tensioner is too large to fit within an allotted space of many automotive applications. In other words, a problem associated with such tensioners is that they are too big because they require a pivot-arm that is too long.

The present invention relates to tensioners in the third category and of the type with arcuate bushings that provide bearing support and damping to pivotal movements of a pivot-arm. The present invention solves the size problem associated with such "long-arm" tensioners by a design that permits the option of shortening the pivot-arm length to be nearly equivalent that of a "short-arm" tensioner in the second category while retaining requisite damping of pivoted movements of the pivot-arm along with an arcuate bushing.

SUMMARY OF THE INVENTION

In accordance with the invention, a belt tensioner of the mechanical type is provided with a pivot-arm pivotally supported with an arcuate bushing attached to a base, a pulley rotatably mounted to the pivot-arm, and a spring between the pivot-arm and base biasing the position of the pivot-arm. The arcuate bushing and pulley have a common radial plane and the arcuate bushing provides bearing support and damping to pivoted movements of the pivot-arm. The arcuate bushing has a concave bearing surface that generally faces toward the pulley. A convex arcuate surface of the pivot-arm is supported by the bearing surface.

An object of the invention is to provide a tensioner of the arcuate bushing type that 1) provides bearing support and damping to pivoted movements of a pivot-arm and 2) optionally has a shorter pivot-arm length than prior art tensioners of the arcuate bushing type.

Another object of the invention is to provide a tensioner design where the pivot-arm length may be selectively chosen from a broad range.

Another object of the invention is to provide a tensioner where the radius of the arcuate bushing may be increased or decreased to provide various levels of damping. An advantage of the invention is that the design accommodates a range of tensioner sizes.

These and other objects of the invention will be apparent after reviewing the drawings and description thereof wherein.

DESCRIPTION OF PREFERRED EMBODIMENTS

Figures 1, 2, 3, 4:
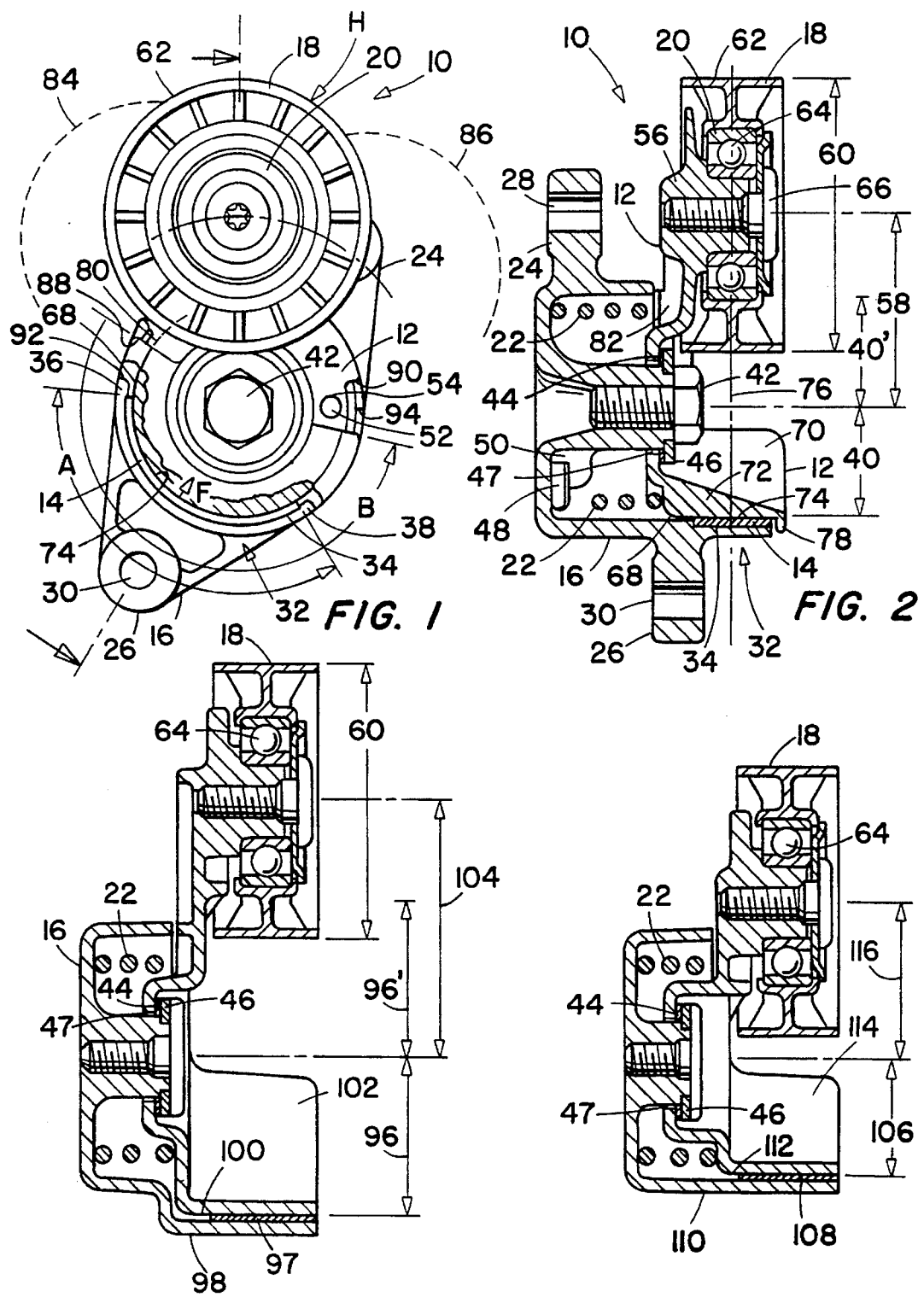
FIG. 1 is a front view of the tensioner with a portion of the pivot-arm arm broken away showing an arcuate bushing of the invention.
FIG. 2 is a cross-sectional view taken generally along the line 2—2 of FIG. 1.
FIG. 3 is a view similar to FIG. 2 but showing an alternate form of the invention.
FIG. 4 is a view similar to FIG. 2 but showing another alternate form of the invention.

Referring to FIGS. 1 and 2, a belt tensioner 10 of the invention is provided and has a pivot-arm 12 pivotally mounted with an arcuate bushing 14 that is supported by a base 16. A pulley 18 is rotatably mounted with a bearing 20 to the pivot-arm and a spring 22 is biased between the base and the pivot-arm.

The base may be of any desired shape, but is shown having a generally "cup" shape for accommodating the spring. Ears 24, 26 with holes 28, 30 are integrally formed of the base 16 for attaching the tensioner by way of fasteners, such as bolts, to an automotive engine bracket or integral bracket, not shown.

The base includes a cantilevered portion 32 which preferably has a cylindrical shape for receiving, and retaining the arcuate bushing that extends through an angle A from about 90° to about 180°. The arcuate bushing may be made of any suitable friction material, such as a plastic, that has a requisite frictional characteristic in combination with a sliding surface of the pivot-arm to provide the requisite damping when the tensioner is in use. As particularly shown in FIG. 1, the cantilevered portion 32 of the base 16 retains and supports the arcuate bushing. While the arcuate bushing may be secured to the base by any desirable means such as with an adhesive or retaining lips added to the band or molding in place, a preferred way of retaining the arcuate bushing to the base is by mechanical means such as in the form of an arcuate cylindrical slot 34 and radial projections 36, 38 that retain and engage opposite ends of the arcuate bushing. The arcuate bushing has sufficient thickness to clear the radial projections and engage the pivot-arm, and a radius 40 preferably between about 20 mm and 60 mm A fastener such as a bolt 42 or flanged bolt head and antifriction washer 44 supported by another washer 46, attaches the pivot-arm 12 to the base. Optionally, a bolt may be used to directly attach the tensioner to an engine which allows for elimination of flanges 24, 26. A radial clearance 47 is provided between the pivot-arm and base to permit unconstricted radial movements of the pivot-arm where it is attached by the bolt.

The spring 22 is preferably in the form of a coiled torsional spring that optionally has an end 48 bent generally radially inwardly to engage a shoulder 50 of the base. The other end of the spring has a generally axially oriented bent end 52 that extends through a hole 54 of the pivot-arm at a side 82 opposite to the convex arcuate surface of the pivot-arm.

The pulley 18 is rotatably mounted with a bearing, such as a ball bearing 64, at one end portion 56 of the pivot-arm and at a radius 58 that defines an operative length for pivotable movements of the pivot-arm. The pulley 18 may be of any material such as molded plastic or metal and have a diameter 60 and a circumference 62. The pulley 18 is attached to the pivot-arm by a fastener such as a threaded bolt 66 that extends through the ball bearing.

The pivot-arm has a convex arcuate surface portion 68 that extends through at an angle B from about 180° to about 225°. The convex arcuate surface portion is preferably formed from a cantilevered portion 70 of the pivot-arm that optionally may have a tapered side wall 72. The convex arcuate surface defines a sliding surface of the pivot-arm that extends at a radius equivalent to the radius 40 for the bushing. The arcuate bushing 14 has a concave bearing surface 74 generally facing F toward the pulley and supporting a part of the convex arcuate surface of the pivot-arm. The arcuate bushing, pulley, and convex arcuate surface of the pivot-arm have at least portions falling in a common radial plane 76. The pivot-arm may also include a radial flange 78 for helping retain the arcuate bushing while also helping initial alignment of the pivot-arm relative to the base.

By making the arcuate bushing with a concave bearing surface generally facing F toward the pulley and supporting a convex arcuate portion of the pivot-arm, the radius 58 or effective length of the pivot-arm may be substantially reduced from that required of the prior art "long-arm" tensioners. The length 58 of the pivot-arm may be shortened such that the circumference of the pulley intersects a circle having a radius of 40' common with a radius 40 of the arcuate bushing. This is illustrated in FIG. 2 where the radius 40' schematically overlaps the diameter 60 of the pulley. Similarly and in FIG. 1, the circumference of the pulley intersects a circle 80 having a radius common with the arcuate bushing.

Referring to FIG. 1, the tensioner is shown positioned in its designed nominal pivot-arm position as induced by a hub load H from a tensioned belt. The hub load is transmitted to the convex arcuate surface of the pivot-arm where it is carried by the bearing surface of the arcuate bushing. The radial clearance 47 between the pivot-arm and the base assures sufficient radial movement of the pivot-arm to permit the convex and concave surfaces to engage and slide against each other without hinderance and thereby effectively aligning the pivot-arm with the arcuate bearing and base. Also, the clearance permits the arcuate bushing to provide unconstricted bearing support and damping to pivoted movements of the pivot-arm. The amount of damping provided by the arcuate bushing is influenced by the length of the radius 40 of the bushing. The shorter the radius, the lesser the damping and conversely, the longer the radius the greater the damping of pivotal movements of the pivot-arm. Reciprocating movements of the pulley (and pivot-arm) may be limited by radial stops 88, 90 formed of the pivot-arm and projections 92, 94 formed of the base.

To illustrate how a compact tensioner may be constructed using the features of the invention, a tensioner was fabricated with the following dimensions depicting tensioner size:

| | |
|---|---|
| pulley diameter | 65 mm |
| pivot arm length | 45 mm |
| base diameter | 60 mm |
| base depth | 56.7 mm |
| arcuate bushing radius | 27.3 mm |
| arcuate busing length | 130° |
| tensioner height (without ears) | 107.5 |

The tensioner was fabricated with a torsional spring to result in a 230 N belt tension force and when tested, demonstrated a 30 percent damping characteristic.

ALTERNATE EMBODIMENTS OF THE INVENTION

Referring to FIGS. 3 and 4, alternate embodiments of the invention are shown which illustrate the versatility of the invention with regard to pivot-arm length and damping. In FIG. 3, the radius 96 of the bushing 97 is increased from that of FIGS. 1 and 2 for greater damping. The bushing is supported by a radially extended, cantilevered portion 98 of the base. Also, the radius 100 of the convex portion of pivot-arm 102 is increased to substantially equal that the of radius 96 of the bearing surface of the arcuate bushing. The length 104 of the pivot-arm is increased relative to that of FIGS. 1 and 2 to illustrate the versatility of the design of the invention.

In FIG. 4, the radius 106 of the bushing 108 is decreased from that of FIGS. 1 and 2 for reduced damping. The bushing is supported by a radially retracted, cantilevered portion 110 of the base. Also, the radius 112 of the convex portion of pivot-arm 114 is decreased to substantially equal that of the bearing surface of the arcuate bushing. The length 116 of the pivot-arm is shortened from that shown in FIGS. 1 and 2 and illustrated a further compactness of size that is achievable using the features of the invention.

The foregoing description is made for the purpose of illustration only and is not intended to limit the scope of the appended claims.

What is claimed is:

1. In a tensioner of the type with a pivot arm pivotally mounted with an arcuate bushing supported by a base, a pulley rotatably mounted to the pivot-arm, a spring between the pivot-arm and base biasing the position of the pivot-arm, and wherein the arcuate bushing and pulley have a common radial plane and the arcuate bushing provides bearing support and damping to pivoted movements of the pivot-arm, the improvement comprising:

the arcuate bushing having a concave bearing surface generally facing toward the pulley; and the pivot-arm having a convex arcuate surface having a portion supported by a portion of the concave bearing surface.

2. The tensioner as claimed in claim 1 wherein the pulley has a circumference that intersects a circle having a radius common with a radius of the arcuate bushing.

3. The tensioner as claimed in claim 2 wherein the pivot-arm has a length between about 35 mm to 75 mm.

4. The tensioner as claimed in claim 1 wherein the arcuate bushing has a radius between about 20 mm to 60 mm.

5. The tensioner as claimed in claim 1 wherein the spring is a torsional spring operatively attached to the pivot-arm at a side opposite to the convex arcuate surface of the pivot-arm.

6. The tensioner as claimed in claim 1 wherein the convex arcuate surface of the pivot-arm is formed of an integral cantilevered portion of the pivot-arm.

7. The tensioner as claimed in claim 6 wherein the cantilevered portion and convex arcuate surface of the pivot-arm extends from about 180° to about 225°.

8. The tensioner as claimed in claim 7 wherein the cantilevered portion of the pivot-arm includes a radial collar that abuts the base.

9. The tensioner as claimed in claim 7 wherein the cantilevered portion has a tapered sidewall.

10. The tensioner as claimed in claim 1 wherein the arcuate bushing extends from about 90° to about 180°.

11. The tensioner as claimed in claim 10 wherein the base has a cantilevered portion that supports the arcuate bushing.

12. The tensioner as claimed in claim 11 wherein the cantilevered base portion has 1) an arcuate cylindrical slot for receiving the arcuate bushing and 2) radial projections that engage and retain opposite ends of the arcuate bushing.

13. The tensioner as claimed in claim 11 wherein the arcuate bushing is retained in an arcuate, cylindrically shaped slot of the base.

14. In a tensioner of the type with a pivot-arm pivotally mounted with an arcuate bushing to a base, a pulley rotatably mounted to the pivot-arm, a spring between the pivot arm and base biasing the position of the pivot-arm, and wherein the arcuate bushing provides bearing support to pivotal movements of the pivot-arm and the arcuate bushing and pulley having a common radial plane, the improvement comprising:

the arcuate bushing having a concave bearing surface generally facing toward the pulley;

the pivot-arm having a convex arcuate surface supported by a portion of the concave bearing surface;

the convex arcuate surface is formed of a cantilevered portion extending from a side of the pivot arm;

the spring is a torsional spring operatively attached to the pivot-arm at a side opposite to the convex surface; and the base has an arcuate cylindrical portion that retains and supports the arcuate bushing.

15. The tensioner as claimed in claim 14 wherein the pulley has a circumference that intersects a circle having a radius common with a radius of the arcuate bushing.

* * * * *